United States Patent
Cordesses et al.

(10) Patent No.: US 8,566,062 B2
(45) Date of Patent: Oct. 22, 2013

(54) METHOD FOR PROCESSING A PRESSURE SIGNAL AND CORRESPONDING DEVICE

(75) Inventors: Lionel Cordesses, Bretonneux (FR); Marco Marsilia, Billancourt (FR); Marcos Navarro, Paris (FR)

(73) Assignee: Renault S.A.S., Boulogne Billancourt (FR)

( * ) Notice: Subject to any disclaimer, the term of this patent is extended or adjusted under 35 U.S.C. 154(b) by 883 days.

(21) Appl. No.: 12/524,008

(22) PCT Filed: Jan. 9, 2008

(86) PCT No.: PCT/FR2008/050035
§ 371 (c)(1),
(2), (4) Date: Feb. 17, 2010

(87) PCT Pub. No.: WO2008/107583
PCT Pub. Date: Sep. 12, 2008

(65) Prior Publication Data
US 2010/0145637 A1     Jun. 10, 2010

(30) Foreign Application Priority Data
Jan. 26, 2007   (FR) .................................. 07 00563

(51) Int. Cl.
*G01L 7/00*   (2006.01)

(52) U.S. Cl.
USPC ........... 702/138; 702/127; 702/140; 702/190; 123/406.22; 123/406.35

(58) Field of Classification Search
USPC .................................. 702/127, 138, 140, 190
See application file for complete search history.

(56) References Cited

U.S. PATENT DOCUMENTS

| | | | | |
|---|---|---|---|---|
| 4,596,218 A * | 6/1986 | Karau et al. | ............ | 123/406.26 |
| 4,610,232 A * | 9/1986 | Iwata | ......................... | 123/406.3 |
| 4,612,901 A * | 9/1986 | Iwata et al. | ................ | 123/406.3 |
| 2003/0010101 A1 | 1/2003 | Zur Loye et al. | | |
| 2003/0158648 A1 * | 8/2003 | Kubota et al. | ................... | 701/96 |

FOREIGN PATENT DOCUMENTS

| | | |
|---|---|---|
| EP | 1 688 601 | 8/2006 |
| FR | 2 878 030 | 5/2006 |
| FR | 2 888 286 | 1/2007 |

* cited by examiner

*Primary Examiner* — Mischita Henson
(74) *Attorney, Agent, or Firm* — Oblon, Spivak, McClelland, Maier & Neustadt, L.L.P.

(57) ABSTRACT

A method, and corresponding device, for processing a pressure signal from a pressure sensor mounted in a combustion chamber to detect a combustion in an internal combustion engine. The method provides a pressure signal; filters the pressure signal with a filtration mechanism having a variable gain; generates an output signal representative of the filtered pressure signal; generates a signal representative of the error between the pressure signal and the output signal; and determines if the combustion has occurred during an expansion phase of the thermodynamic cycle.

8 Claims, 2 Drawing Sheets

METHOD FOR PROCESSING A PRESSURE SIGNAL AND CORRESPONDING DEVICE

BACKGROUND

The present invention relates to the field of combustion detection for an internal combustion engine.

More precisely, the invention relates, according to a first of its subjects, to a method for processing a pressure signal (p) originating from a pressure sensor mounted in a combustion chamber, for the purpose of detecting combustion in an internal combustion engine, comprising the steps consisting in:
- supplying a pressure signal (p),
- filtering the pressure signal (p) by filtering means having a variable gain (7),
- establishing an output signal (out) representative of the filtered pressure signal (p), and
- establishing a signal (e) representative of the error between the pressure signal (p) and the output signal (out).

Such a method is known to those skilled in the art.

However, the various solutions proposed by the prior art in order to modify the bandwidth of the means for filtering the pressure signal lead to nonlinear filters.

In addition, these solution are based on the hypothesis that combustion takes place during the compression phase of the cylinder in the combustion chamber.

In certain cases, combustion may take place in the expansion phase of the thermodynamic cycle, in particular during combustions called exotic combustions. These combustions pose engine-control problems.

BRIEF SUMMARY

The object of the present invention is to remedy these disadvantages by proposing a method, and the device for applying it, the object of which is to determine the moment of beginning of combustion, with the value of the pressure signal (p) as the only initial item of information.

Although it is not limited thereto, the present invention is advantageously applied in an engine called an HCCI, for "Homogeneous Charge Compression Ignition" wherein the air-fuel mixture is mixed in the most homogeneous possible manner and compressed quite highly in order to reach the auto-ignition point.

In particular, the combustion in an HCCI engine begins in several locations at a time, the result of which is an almost simultaneous combustion of the whole of the air-fuel mixture. Engine combustion is then more difficult to control.

With this objective in view, the device according to the invention, moreover complying with the preamble cited above, is essentially characterized in that it also comprises a step consisting in:
- determining whether combustion has taken place during an expansion phase of the thermodynamic cycle.

In one embodiment, the method according to the invention also comprises the steps consisting in:
- establishing a signal (p1) representative of the time differential filtered by a low-pass filter of the pressure signal (p), the establishment of the signal (p1) and the filtering of the time differential being carried out by a block (1),
- establishing a signal (p2) representative of the comparison between the value of the signal (p1) and a threshold (threshold 1),
- establishing a signal (p5) representative of the comparison between the value of the pressure signal (p) and a threshold (threshold 4),
- establishing a signal (Q) representative of the beginning of the expansion phase in the thermodynamic cycle by combining the signals (p2) and (p5).

Advantageously, the time differential of the pressure signal (p) represents an image of the quality of combustion.

Preferably, the method according to the invention also comprises the steps consisting in:
- establishing a signal (e4) representative of the comparison between the value of the error signal (e) and a threshold (threshold 2),
- establishing an intermediate signal (X) representative of a great and rapid increase in the pressure in the combustion chamber in the expansion phase, by combining the signals (Q), (p2) and (e4).

Optionally, the method according to the invention also comprises a step consisting in:
- determining whether the combustion has taken place in a compression phase of the thermodynamic cycle.

In this case, the method according to the invention advantageously also includes a step consisting in:
- establishing a signal (e6) representative of the comparison between the value of the error signal (e) and a threshold (threshold 3).

In one embodiment, the method according to the invention also comprises a step consisting in:
- generating a signal (z) for controlling the filtering means having a variable gain (7) in order to obtain a variable gain (K0, K1) as a function in the value of the intermediate signal (X) or of the signal (e6).

The use of a single integrator (1/S) downstream of the filtering means having a variable gain, as described below, is advantageously simple and of limited cost.

According to another of its objects, the present invention also relates to a device capable of applying the method according to the invention.

Accordingly, the device according to the invention is a device for acquiring and for processing a pressure signal (p) originating from a pressure sensor mounted in a combustion chamber of an internal combustion engine, for the purpose of detecting a combustion therein, the device being capable of applying the method as claimed in any one of the preceding claims, and comprising:
- means for acquiring the pressure signal (p),
- means for processing said pressure signal (p),
- means for detecting the evolution of the pressure signal (p),
- filtering means having a variable gain (7) in order to filter the pressure signal (p),
- means (1/S) for establishing an output signal (out) representative of the filtered pressure signal (p), and
- means for establishing a signal (e) representative of an error that can exist between the pressure signal (p) and the output signal (out).

According to the invention, the device is essentially characterized in that the means for detecting the evolution of the pressure signal (p):
- are configured to at least detect a pressure drop from the pressure signal (p), so as to determine whether the thermodynamic cycle is in the expansion phase, and
- comprise means for detecting an increase in pressure during said expansion phase of the thermodynamic cycle, so as to determine whether the combustion took place during said expansion phase of the thermodynamic cycle.

The device according to the invention also comprises:
- first comparison means (2) for establishing a signal (p2) representative of the comparison between the value of the signal (p 1) and a threshold (threshold 1), second comparison means (5) for establishing a signal (p5) representative of the comparison between the value of the pressure signal (p) and a threshold (threshold 4), third comparison means (4) for establishing a signal (e4) representative of the comparison between the value of the error signal (e) and a threshold (threshold 2), means (3) for establishing a signal (Q) representative of the beginning of the expansion phase in the thermodynamic cycle by combining the signals (p2) and (p5).

Preferably, the means (1) for establishing a signal (p1) representative of the time differential of the pressure signal (p) filtered by a low-pass filter comprise a linear filter the transfer function of which is as follows:

$$F(s)=s/(1+\tau s)$$

wherein s is the Laplace variable and τ is the time constant chosen as a function of the frequency band of the noise of the pressure signal (p).

Also preferably, the means (3) for establishing a signal (Q) representative of the beginning of the expansion phase in the thermodynamic cycle comprise an RS flip-flop the input (S) of which is connected to the output of a logic AND port the inputs of which are connected to the signals (p2) and (p5), and the input (R) of which is connected to the inverted signal (p5).

BRIEF DESCRIPTION OF THE DRAWINGS

Other features and advantages of the present invention will appear more clearly on reading the following description given as an illustrative and nonlimiting example and made with reference to the appended figures in which.

DETAILED DESCRIPTION

In the present description, no distinction is made between a signal or the communication line through which it passes.

Figure 1:
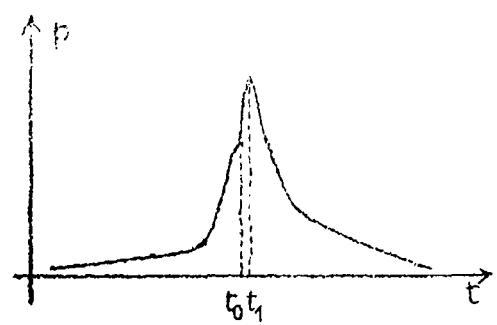
FIG. 1 represents the evolution over time of a pressure signal when combustion takes place in the compression phase.

FIG. 1 illustrates the speed of a pressure signal, that is to say originating from a pressure sensor mounted in a combustion chamber, when the engine has a normal behavior, that is to say combustion takes place in the compression phase.

In the compression phase, the pressure increases in the combustion chamber.

When combustion takes place, the pressure increases in the combustion chamber.

In this example, combustion takes place between the moments t0 and t1. The two effects are combined, and the signal p passes through a maximum, in this instance corresponding to the time t1.

However it happens that combustion takes place during an expansion phase.

In the expansion phase, the pressure reduces in the combustion chamber.

Figure 2:
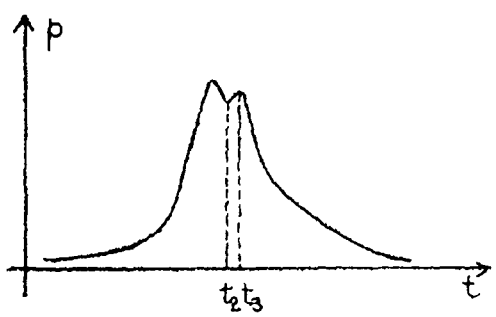
FIG. 2 represents the evolution over time of a pressure signal when combustion takes place in the expansion phase.

In this case, illustrated in FIG. 2, the signal p passes through a first maximum corresponding to the top dead center, and a second maximum, in this instance corresponding to the time t3, combustion taking place between the moments t2 and t3.

Such combustions risk damaging the control of the engine, and even the engine itself. Also, the object of the present invention is to detect the moments of combustion, in particular when the latter take place in the expansion phase, and thanks only to items of information originating from a pressure sensor mounted in a combustion chamber.

Accordingly, a pressure sensor delivers a pressure signal p representative of the pressure in the combustion chamber in which it is mounted.

A pressure signal p is conventionally noised.

Figure 3:
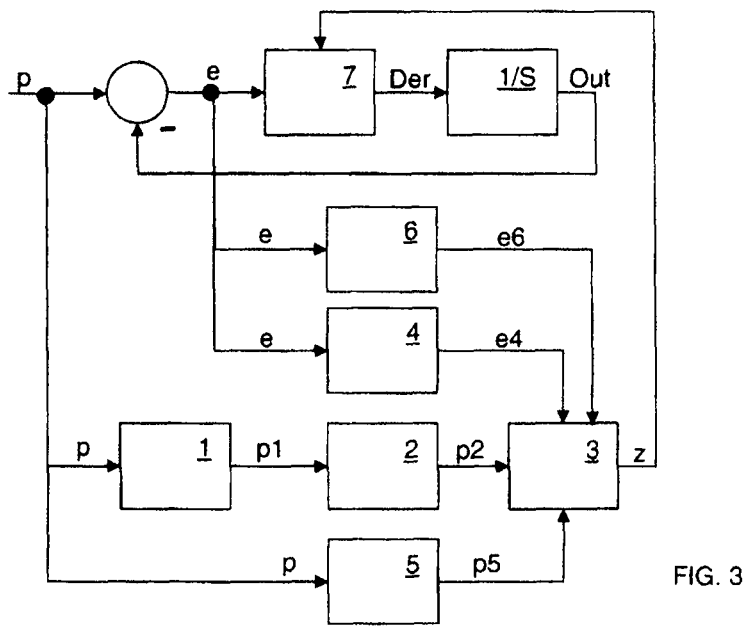
FIG. 3 represents an embodiment of the device according to the invention.

One of the subjects of the present invention relates to a device for processing a pressure signal p, illustrated in FIG. 3.

The device according to the invention comprises filtering means 1 (block 1), configured to filter the pressure signal p.

The filtering means produce a linear filter the transfer function of which is as follows:

$$F(s)=s/(1+\tau s) \quad (1)$$

wherein s is the Laplace variable.

The filtering means 1 deliver at the output a signal p1. The signal p1 is a signal equivalent to the differential of the raw pressure signal p received by the filtering means 1 at the input, this differential being filtered by a low-pass filter in order to limit the noise.

According to the invention, the time constant T of the equation (1) is chosen as a function of the frequency band of the noise of the pressure signal p.

The signal p1 is brought to the input of a block 2 the output of which delivers a signal p2.

The block 2 is configured to perform a thresholding function relative to a negative or zero threshold threshold1 (first threshold), such that the binary signal p2 is equal to 1 if the value of the signal p1 is less than or equal to the threshold threshold1, and equal to 0 otherwise.

This therefore gives:

p2=1 if p1<threshold1 p2=0 if p1>threshold1 where threshold1≤0

The signal p2 takes the value 1 when the differential (filtered) p1 of the pressure signal p is negative and less than the value of the threshold threshold1, that is to say when the pressure falls in the combustion chamber, and this fall is significant, the threshold threshold1 being equivalent to a certain gradient of the pressure signal p.

In a similar manner, the blocks 4 and 6 produce a thresholding step.

The block 4 is configured to produce a thresholding step relative to a positive threshold threshold2 (third threshold), such that the binary signal e4 is equal to 1 if the value of the error signal e is greater than or equal to the threshold threshold2, and equal to 0 otherwise.

The error signal e corresponds to the output signal of the device OUT subtracted from the pressure signal p.

This then gives:

e4=1 if e≥threshold2 e4=0 if e<threshold2 where threshold2≥0.

The signal e4 takes the value 1 when the error signal e is positive and greater than the threshold threshold2.

The block 4 is configured to detect an increase in the pressure in the expansion phase (for example: combustion).

The block 6, which is optional, is configured to produce a thresholding step relative to a positive threshold threshold3 (fourth threshold), such that the binary signal e6 (fourth signal) is equal to 1 if the value of the error signal e is greater than or equal to the threshold threshold3, and equal to 0 otherwise.

This then gives:

e6=1 if e≥threshold3 e6=0 if e<threshold3 where threshold3≥0 and, preferably, threshold3>threshold 2.

The signal e6 takes the value 1 when the error signal e is positive and greater than the threshold threshold3.

The block 6 is configured to detect an increase in pressure in the compression phase (for example: combustion).

The block 5 is also configured to perform a thresholding step relative to a positive threshold threshold4 (second threshold), such that the binary signal e6 is equal to 1 if the value of the pressure signal p is greater than or equal to the threshold threshold4, and equal to 0 otherwise.

This then gives:

P5=1 if p≥threshold 4 p5=0 if p<threshold 4 where threshold4≥0.

The signal p5 takes the value 1 when the pressure signal p is positive and greater than the threshold threshold4.

The block 3 receives at the input the signals p2, p5, e4 and e6, and delivers at the output a signal z transmitted to the input of the block 7.

Figure 4:
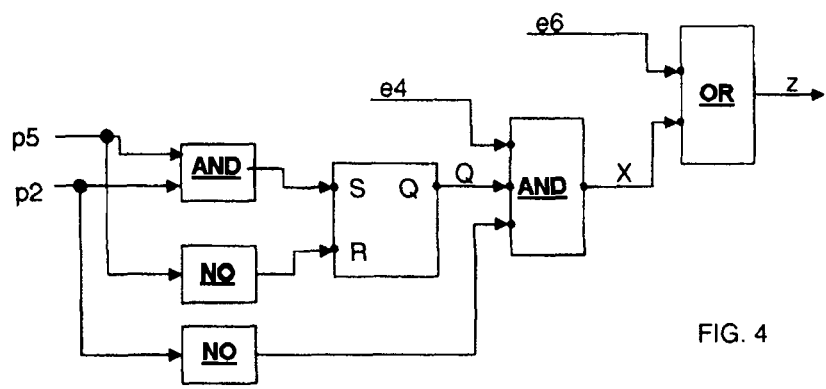
FIG. 4 represents an embodiment of the block 3 of FIG. 3.

The block 3 is illustrated in greater detail in FIG. 4. It comprises an RS flip-flop comprising an input R and an input S, and delivering an output signal Q.

The signals p2 and p5 are connected to a respective input of an AND port the output of which is connected to the input S of the flip-flop.

The input R of the flip-flop is connected to the inverted signal p5.

This then gives:

S=1 if p2=1 and p5=1

S=0 otherwise

R=1 if p5=0

R=0 otherwise.

When the input S is set to 1, the output Q of the flip-flop goes to 1.

When the input R is set to 1, the output Q of the flip-flop goes to zero.

The transition to 1 of the output Q indicates that the value of the pressure signal p is diminishing (because p2=1) but that this value is above the threshold threshold4 (because p5=1).

Therefore, the transition to 1 of the output Q makes it possible to determine the beginning of the expansion phase in the thermodynamic cycle of combustion.

However, according to the invention, it is not desired to increase the bandwidth of the filtering means for the whole of the expansion phase but only when a combustion takes place. For this reason, the combustion is detected by means of the signals e4 and e6 as described below.

The output signal from the flip-flop Q is connected as an input of an AND port to three inputs the second input of which is connected to the inverted signal p2, and the third input is connected to the signal e4.

The AND port with three inputs delivers an intermediate signal X at the output.

This then gives:

X=1 if e4=1 and Q=1 and p2=0

X=0 otherwise.

The intermediate signal X makes it possible to detect a great and rapid increase in the pressure in the combustion chamber, that is to say a steep gradient of the pressure signal p in the expansion phase.

Consequently, the intermediate signal X makes it possible to control the command of the increase in the bandwidth of the filtering means.

The condition e4=1 in the construction of the intermediate signal X makes it possible to increase the bandwidth of the filtering only during the rising phases of the pressure signal p.

The optional step consisting in determining whether combustion has taken place during a compression phase of the thermodynamic cycle is carried out by the logic OR port an input of which is connected to the signal X, and the other to the signal e6.

Therefore, the output signal z from the OR port is the output signal z from the block 3.

This then gives:

z=1 is X=1 or if e6=1 z=0 otherwise.

The condition e6=1 in the construction of the signal z makes it possible to detect a rapid and great amplitude increase (as a function of the value of the threshold threshold3) of the value of the pressure signal p, in the compression phase.

The output signal z of the block 3 is connected as an input of the block 7 (FIG. 3).

The block 7 is configured to perform a step of variable gain and deliver at the output a signal Der.

The variable gain generated by the block 7 is a function of the value of the output signal z of the block 3.

Let K0 be a first gain that can be generated by the block 7, and K1 a second gain that can be generated by the block 7, thus giving:

If z=0, the block 7 generates the gain K0

If z=1, it is considered that a combustion has taken place, and the block 7 generates the gain K1.

The choice of the value of the gains K0 and K1 makes it possible to define the bandwidth of the filtering means.

Preferably, K1>K0, which makes it possible to filter the pressure signal p with a large bandwidth, corresponding to the gain K1, when the signal z is equal to 1, that is to say:

either when the pressure in the combustion chamber increases rapidly, and this increase is of great amplitude, and the cylinder of the combustion chamber is in the compression phase, or when the pressure increases rapidly and the cylinder of the combustion chamber is in the expansion phase.

In the other cases, that is to say when the signal z is equal to zero, the device according to the invention makes it possible to filter the pressure signal p with a small bandwidth, corresponding to the gain K0, in order to filter the high-frequency and small-amplitude components (noise).

The output signal Der of the block 7, corresponding to the differential of the filtered pressure signal p, is connected to the input of an integrator (1/S) the output of which delivers an output signal OUT, corresponding to the filtered pressure signal p, connected to the aforementioned subtractor for the construction of the error signal e.

The assembly comprising the subtractor, the block 7 and the integrator forms a first-order filter when the gain of the block 7 is fixed. In this case, the gain K0 (or K1) fixes the bandwidth of the filter.

By virtue of the invention, the pressure signal p can be filtered even during exotic combustion, that is to say in the expansion phase, when combustion takes place after top dead center.

The output signal OUT can be connected to control means, in particular to the electronic control unit (ECU) of the engine.

The invention claimed is:

1. A method for processing a pressure signal originating from a pressure sensor mounted in a combustion chamber, for detecting combustion in an internal combustion engine, the processing of the pressure signal comprising:
    filtering the pressure signal by a filter having a variable gain;
    using the filter to establish an output signal representative of the filtered pressure signal;
    using a first comparison means to establish a first signal by comparing a value of the pressure signal and a first threshold;
    using a second comparison means to establish a second signal by comparing the value of the pressure signal and a second threshold;
    using a means to establish a signal representative of an error that can exist between the pressure signal and the output signal;
    using a third comparison means to establish a third signal by comparing a value of the error signal and a third threshold;
    using an RS flip-flop to establish, as an output of the RS flip-flop, a signal representative of a beginning of an expansion phase in the thermodynamic cycle, the RS flip-flop including a first input connected to an output of a first logic AND port the inputs of which are connected to the first and second signals, and a second input of the RS flip-flop is connected to an inverted representation of the second signal; and
    using a second logic AND port to establish, as an output of the second logic AND port, an intermediate signal that indicates that combustion has occurred in the combustion chamber in the expansion phase when the inputs of the second logic AND port include
        the signal output by the RS flip-flop indicating the beginning of the expansion phase in the thermodynamic cycle,
        an inverted representation of the first signal indicating that the value of the pressure signal is greater than the first threshold, and
        the third signal indicating that the value of the error signal is greater than or equal to the third threshold.

2. The method as claimed in claim 1, wherein the filtering of the pressure signal is performed by a low-pass filter.

3. The method as claimed in claim 1, further comprising:
    determining whether combustion has taken place during a compression phase of the thermodynamic cycle.

4. The method as claimed in claim 3, further comprising:
    establishing a fourth signal representative of the comparison between the value of the error signal and a fourth threshold, the fourth threshold being greater than the third threshold,
    wherein combustion is determined to have taken place during the compression phase when the fourth signal indicates that the value of the error signal is greater than or equal to the fourth threshold.

5. The method as claimed in claim 4, further comprising:
    generating a signal for controlling the filter having a variable gain to obtain a variable gain as a function of a value of the intermediate signal and of the fourth signal.

6. A device for acquiring and for processing a pressure signal originating from a pressure sensor mounted in a combustion chamber of an internal combustion engine, for detecting a combustion therein, the device comprising:
    means for acquiring the pressure signal;
    means for processing the pressure signal;
    means for detecting evolution of the pressure signal;
    filtering means having a variable gain to filter the pressure signal;
    means for establishing an output signal representative of the filtered pressure signal;
    means for establishing a first signal representative of a comparison between a value of the pressure signal and a first threshold;
    means for establishing a second signal representative of a comparison between the value of the pressure signal and a second threshold;
    means for establishing a signal representative of an error that can exist between the pressure signal and the output signal;
    means for establishing a third signal representative of a comparison between a value of the error signal and a third threshold;
    means for establishing a signal representative of the beginning of the expansion phase in the thermodynamic cycle, the means for establishing including an RS flip-flop with a first input connected to an output of a first logic AND port the inputs of which are connected to the first and second signals, and a second input of the RS flip-flop is connected to an inverted representation of the second signal; and
    means for establishing, as an output of a second logic AND port, an intermediate signal that indicates that combustion has occurred in the combustion chamber in the expansion phase when the inputs of the second logic AND port include
        the signal output by the RS flip-flop indicating the beginning of the expansion phase in the thermodynamic cycle,
        an inverted representation of the first signal indicating that the value of the pressure signal is greater than the first threshold, and
        the third signal indicating that the value of the error signal is greater than or equal to the third threshold.

7. The device as claimed in claim 6, wherein the filtering means include a low-pass filter.

8. The device as claimed in claim 7, wherein the low-pass filter comprises a linear filter with a transfer function as follows:

$$F(s)=s/(1+\tau s)$$

wherein s is a Laplace variable and $\tau$ is a time constant chosen as a function of a frequency band of noise of the pressure signal.

* * * * *